March 1, 1927.
J. A. DEDOUCH
1,619,568
EXPANSIBLE FASTENING
Filed Dec. 19, 1925
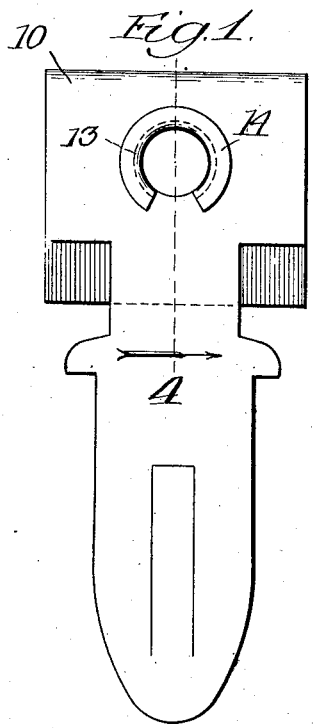
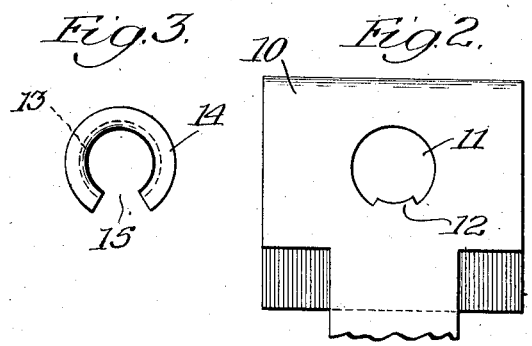
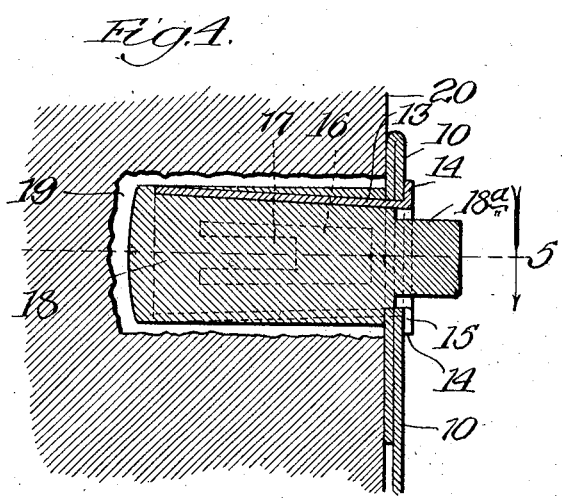
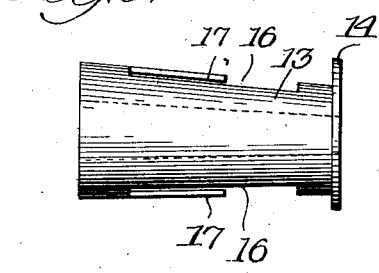
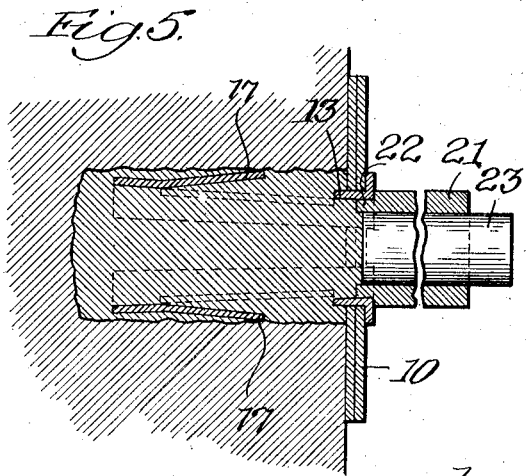
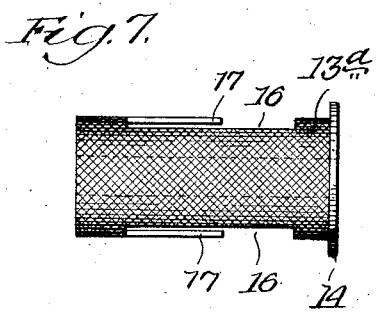
Inventor:
Joseph A. Dedouch,
By Dyrenforth, Lee, Chritton & Wiles
Attys.

Patented Mar. 1, 1927.

1,619,568

UNITED STATES PATENT OFFICE.

JOSEPH A. DEDOUCH, OF OAK PARK, ILLINOIS.

EXPANSIBLE FASTENING.

Application filed December 19, 1925. Serial No. 76,464.

This invention relates to expansible fastenings and is particularly adapted to be used for securing metal plates and the like on the face of stone work, such as monuments. The invention is fully described in the following specification.

As shown in the accompanying drawing, Figure 1 is a front elevation of a sheet-metal fastening for attaching a medallion, or the like, to the front of a monument;

Fig. 2 is a similar view showing the open hole in the plate adapted to receive the sheet-metal member;

Fig. 3 is an end elevation of the sheet-metal member;

Fig. 4 is a partial enlarged section on the line 4 of Fig. 1 showing the fastening with the soft metal plug inserted and ready to be set in the hole in the monument;

Fig. 5 is a section on the line 5 of Fig. 4 showing the soft metal plug driven in and the fastening secured to the monument;

Fig. 6 is a side elevation of the sheet-metal member shown in Figs. 4 and 5; and Fig. 7 is a similar view of a modified form of sheet-metal member.

The embodiment illustrated comprises a nearly flat sheet-metal plate 10 which has an opening 11 therein which is preferably circular in form but has an inwardly projecting lip 12.

Through this opening is inserted a hollow sheet-metal member 13 which is adapted to be inserted through the opening 11 and having a flange 14. This member is open at 15 so that to insert it into the opening 11, it is collapsed somewhat and again expanded after being inserted. When so inserted the lip 12 will extend into the opening 15 thereby preventing rotation of the member 13 with respect to the plate 10.

The member 13 has openings 16 in the sides and these are preferably so formed as to define outwardly extending projections 17. A soft metal plug 18 of lead, or the like, is inserted into the hollow member 13. This is preferably done by pouring which causes the lead to flow into the openings 16, thereby retaining the plug in the device. It may, however, if desired, be slipped or driven in. In any case, the plug extends some distance beyond the flange 14 as at $18^a$.

To insert the device, a hole 19 is drilled in the face of the stone 20, the hole being only slightly larger than the exterior of the hollow member 13. For the sake of illustration, however, the opening is shown considerably larger. The operator then inserts the fastening into the hole 19 and places a tool 21 over the projection $18^a$. This tool has a lip 22 which lies within the flange 14 to center the tool, which has a plunger 23 of the same size as the projection $18^a$. The operator then strikes the plunger 23 a sharp blow with a hammer, thereby forcing the projection $18^a$ through the flange 14 and causing the soft metal of the plug 18 to spread the sheet-metal member 13, forcing the projection 17 into contact with the walls of the hole 19 and causing the soft metal to flow through the end and side openings of the sheet-metal member 13 so as to substantially fill the opening 19, as shown in Fig. 5. Thus a firm grip is obtained upon the walls of the hole 19 which is ordinarily made with a stone drill and therefore rather rough. In actual practice, it has been found practically impossible to twist the plate 10 with respect to the hole when so mounted therein without breaking the fastening, or to remove the plate from the wall. The projections 17 aid in getting a firmer grip on the interior of the hole.

In the form shown in Figs. 4, 5 and 6, the sheet-metal member 13 is made slightly conical so as to permit the lead to flow readily through the upper portions of the openings 15 so as to force it between the member 13 and the walls of the hole 19. In Fig. 7 is shown another form of the device in which the member $13^a$ is roughened or cut with solder on its external face so that when it is forced into contact with the walls of the hole 19 it will get a firmer grip thereon. This roughening, of course, may be done in the case of the member 13 shown in Fig. 6, if so desired.

While I have shown and described but a few embodiments of my invention, it will be understood that it is capable of many modifications. Changes, therefore, in the construction and arrangement may be made which do not depart from the spirit and scope of the invention as disclosed in the appended claims.

What I claim as new, and desire to secure by Letters Patent, is:

1. In a device of the class described, a member having an opening therein, a hollow open ended member secured therein and protruding on one side of the first mentioned member for insertion in a hole, openings in the side of said member, outwardly projecting fingers in said openings adapted to be forced outwardly into contact with the walls of said hole, and a soft metal plug expansible in said hollow member for expanding said device in a hole and for forcing said fingers outwardly.

2. In a device of the class described, a hollow member having a passage therethrough and being open along one side, and a soft metal plug therein adapted to spread said member so as to expand said device into contact with the walls of a hole into which it is inserted when said plug is spread by a tool inserted through the outer end of said member, said soft metal also passing around the bottom end of the hollow member.

3. In a device of the class described, a hollow member, said member having a passage therethrough and being open along one side, outwardly extending projections formed in the sides of said member, said projections being adapted to be pressed outwardly, and a soft metal plug therein having an end extending beyond the outer end of the device adapted to spread said member so as to expand said device into contact with the walls of a hole into which it is inserted when said plug is spread by driving said end through the outer end of said member.

JOSEPH A. DEDOUCH.